United States Patent [19]
Caulk, Jr. et al.

[11] Patent Number: 5,392,391
[45] Date of Patent: Feb. 21, 1995

[54] HIGH PERFORMANCE GRAPHICS APPLICATIONS CONTROLLER

[75] Inventors: Robert L. Caulk, Jr., Pleasantor; Sanjay M. Desai, San Jose; Jay P. Patel, Union City, all of Calif.

[73] Assignee: LSI Logic Corporation, Milpitas, Calif.

[21] Appl. No.: 780,855

[22] Filed: Oct. 18, 1991

[51] Int. Cl.⁶ .......................... G06F 3/14; G06F 15/20
[52] U.S. Cl. ..................................... 395/162; 395/163;
364/228.6; 364/238; 364/238.3; 364/238.6;
364/238.7; 364/DIG. 1
[58] Field of Search ............... 395/162, 163, 164, 800,
395/650; 364/228.6, 238.3, 238, 238.6, 238.7

[56] References Cited

U.S. PATENT DOCUMENTS

| | | | |
|---|---|---|---|
| 4,858,107 | 8/1989 | Fedele | 395/164 |
| 4,916,301 | 4/1990 | Mansfield et al. | 395/163 |
| 4,949,280 | 8/1990 | Littlefield | 395/163 |
| 4,958,303 | 9/1990 | Assarpour et al. | 395/163 |
| 5,109,520 | 4/1992 | Knierim | 395/800 |
| 5,157,388 | 10/1992 | Kohn | 395/162 |
| 5,179,637 | 1/1993 | Nardozzi | 395/163 |
| 5,187,777 | 2/1993 | Conboy et al. | 395/163 |
| 5,201,035 | 4/1993 | Stytz et al. | 395/163 |
| 5,222,213 | 6/1993 | Petty | 395/163 |

OTHER PUBLICATIONS

LSI Logic LR33000 Self-Embedding Processor, Dec. 1991, pp. 1–24.
Intel 8042/8742 Universal Peripheral Interface 8-Bit Microcomputer, 1983, pp. 5/826–5/830.
Texas Instruments TI34010 Manual, 1986, pp. A3–A33 and 1/3–1/9..

Primary Examiner—Kevin A. Kriess
Assistant Examiner—Dennis M. Butler
Attorney, Agent, or Firm—Poms, Smith, Lande & Rose

[57] ABSTRACT

A high performance graphics applications controller having a core processor and a coprocessor to independently perform desired graphics functions is provided. The core processor and the coprocessor divides processing tasks to speed execution and to reduce the burden on the host CPU. A direct memory access (DMA) controller cooperates with the coprocessor to generate source and destination addresses and employs a unique set of commands to speed operation. The core processor employs a local CPU and data and address catches to locally perform desired graphics operations independently but in conjunction with the coprocessor. The present invention has particular application with smart terminals and wherever pixel oriented data is required.

3 Claims, 2 Drawing Sheets

HIGH PERFORMANCE GRAPHICS APPLICATIONS CONTROLLER

CROSS REFERENCE TO RELATED APPLICATIONS

This application is related to application Ser. No. 07/596,680, filed on Oct. 11, 1990, the contents of which are hereby incorporated by reference.

FIELD OF THE INVENTION

The present invention relates to a high performance graphics controller designed to accelerate the speed of data movement and manipulation. More specifically, the present invention relates to a high performance graphics controller for accelerated graphics processing and display applications.

BACKGROUND OF THE INVENTION

The evolution and use of computer systems has created a need for video terminals that can achieve higher performance in numerous applications. CAD systems, word processing, order entry systems, high density text manipulation, high density graphics, animation applications and/or combinations of these applications increasingly demand higher performance as the complexity of these systems evolve. For example, graphics displays have greatly increased in pixel density in recent years and require greater data processing than was previously required by less complex displays.

Typically, three types of terminals have been used with such systems. These terminals are known in the art as "dumb terminals," "work stations, " and "smart terminals." Dumb terminals have no remote computing intelligence and are dependent upon a central host CPU to perform computational and graphics operations. Dumb terminals have the attendant disadvantage of relying upon and therefore burdening the central CPU. To relieve this burden, additional central CPU processing capability must be added or additional delay time is suffered.

Work stations are stand-alone computers which, although they can perform data manipulation, computation and graphics operations, typically do not share a common data base with the central CPU, are more expensive than dumb terminals and require maintenance of component parts such as disk drives and other components. Other work stations may be networked with the central CPU, however, this is a high cost alternative considering the cost of the remote overall computer and networking.

Smart terminals are essentially a hybrid between a dumb terminal and a work station. A smart terminal typically employs a local CPU which has some computational and graphics capability and which functions apart from the central CPU. A smart terminal also typically accesses a CPU memory and therefore overcomes the attendant problems associated with an independent work station and yet also provides intelligence not present in a dumb terminal.

Smart terminals used in graphics applications require a graphics controller which can modify and update pixel bit maps at a high speed, update text, draw lines and perform other graphics functions.

Prior art smart terminals typically burden the processor with low complexity transfer and manipulation operations because the processor is unable to proceed with other tasks while these low level operations are in progress. This prevents pre-processing of other information, and temporarily employs the processor's entire capacity to perform relatively simple tasks.

Therefore a dire need exists for a high performance graphics application controller that satisfactorily operates modern high performance terminals without unduly burdening the host computer and without the attendant disadvantages of independent work stations. This need exists in all environments that require pixel oriented data processing.

SUMMARY OF THE INVENTION

Accordingly, it is an object of the present invention to provide a high performance graphics applications controller which provides greater processing capability than prior art devices.

It is a further object of the present invention to provide a device that efficiently integrates a direct memory access (DMA) controller with a graphics core processor and graphics coprocessor, such that the coprocessor executes low level commands, while the core processor independently performs other commands.

It is a further object of the present invention to provide a graphics controller that can manipulate data at an accelerated rate, as compared to prior art devices, without degrading performance and thereby allowing use of higher resolution terminals having greater pixel counts.

It is a further object of the present invention to provide a graphics controller that executes high performance graphics oriented operations, yet can be manufactured for a relatively low cost, employs fewer components and has lower power consumption, as compared to typical prior art devices.

It is a further object of the present invention to provide a high performance graphics application controller in a single integrated circuit, that requires minimal external components and which is capable of driving video displays, graphics printers, terminals, or other display devices.

In order to accomplish these and other objects, there is provided a graphics controller having two processors, a core processor and a co-processor. The core processor interfaces with external memory and sends and receives data therefrom.

The co-processor of the present invention performs certain graphics data manipulation tasks in order to reduce the operational burden on the core-processor so that the core-processor can perform higher level functions at a higher speed. This results in a high performance graphics controller which, in turn, greatly reduces the need for computational servicing by the host computer. The speed of operation of the core processor is enhanced by reducing the amount of core processor time needed for transfer operations. Low complexity data transfer manipulation operations are performed by the coprocessor without core-processor intervention.

The core processor, coprocessor, and DMA controller are all capable of addressing portions of a common memory to further increase processing speed and reduce the amount of memory required to support high speed graphics applications. The unique architecture of the present invention allows implementation in a single integrated circuit.

Other objects, features and advantages of the present invention will become apparent to those skilled in the art from a reading of the subject specification, appended claims, and a review of the attached drawings.

DESCRIPTION OF AN EXEMPLARY PREFERRED EMBODIMENT

In the following description, for purposes of explanation, numerous details are set forth such as specific memory sizes, data paths, word sizes, bit designations, data path widths, circuit components, display screen menus, data bases, etc. in order to provide a more thorough understanding of the present invention. However, it will be apparent to one skilled in the art, and it is fully intended herein, that these specific details are not required in order to practice the present invention. In other instances, well known electrical structures and circuits are shown in block diagram form in order not to obscure the present invention unnecessarily.

Although the foregoing description highlights the operation of certain units, the present invention has been implemented in a single integrated circuit in order to minimize power consumption, overall component count, and create a smaller footprint. It will be appreciated, however, that the concepts embodying the present invention are not limited to a single integrated circuit.

Figure 1:
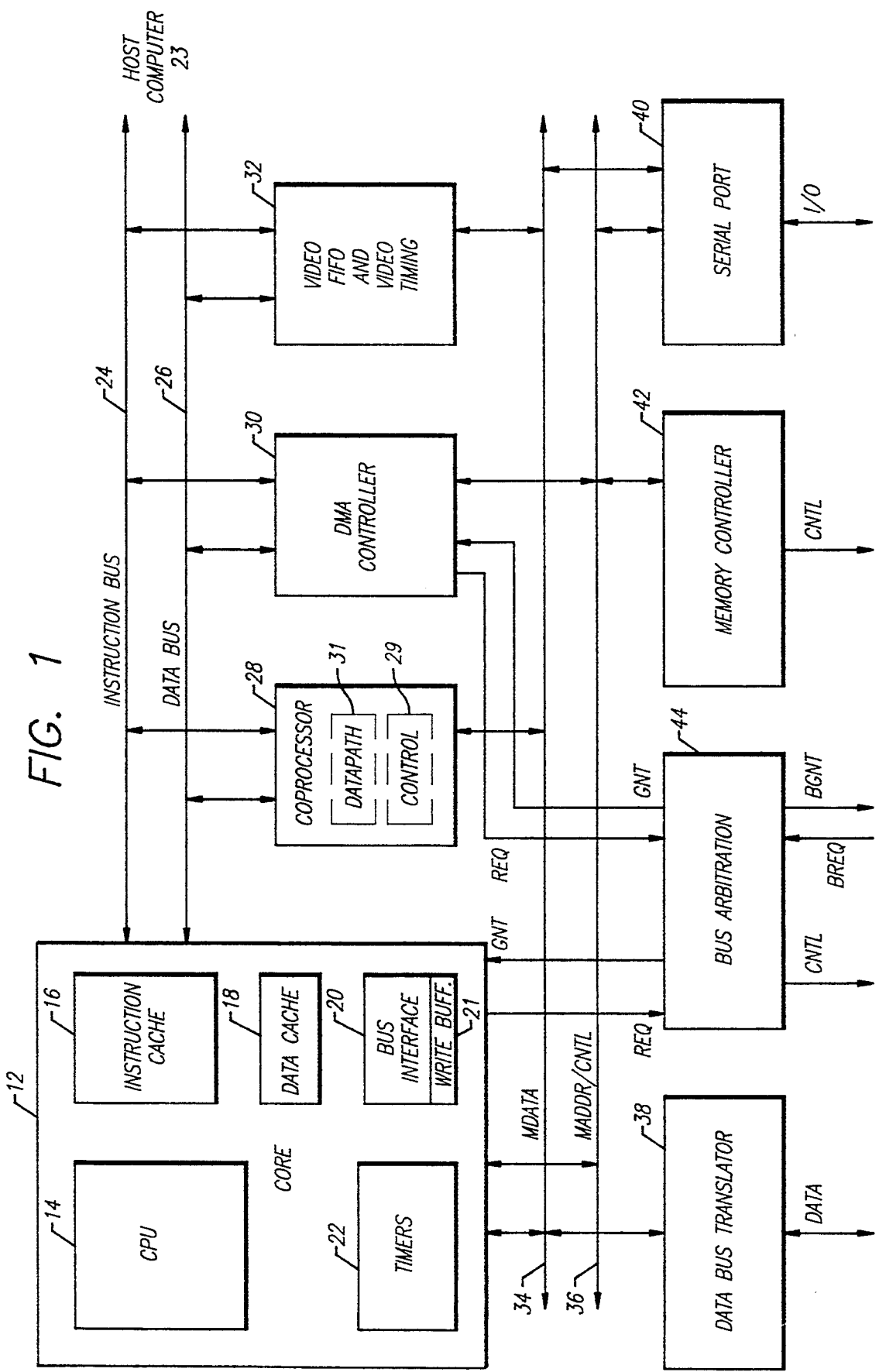
FIG. 1 is an overview block diagram of the high performance graphics applications controller of the present invention.

FIG. 1 illustrates an over-view block diagram of a graphics controller embodying concepts of the present invention. The graphics controller of the present invention includes a core processor 12 which comprises a central processor unit (CPU) 14, an instruction cache 16, a data cache 18, a bus interface unit 20, and timers 22.

The core processor 12 communicates, and otherwise receives instructions for execution from a host computer 23. The core processor 12 orchestrates manipulation of data to execute the instructions sent by the host computer 23. These instructions have varying degrees of complexity. Some instructions require more of the core processor's computing capabilities than other instructions, that require little or none. In order to optimize performance of the overall system, specific instructions are selected which are implemented outside the core processor.

These specific instructions are implemented with a combination of hardware and software through a coprocessor 28, and a direct memory access(DMA) controller 30, as will later be described in more detail. Coprocessor 28 works in conjunction with DMA controller 30 to execute specific instructions without the need for intervention by the core processor. The coprocessor stores certain instructions for execution and the DMA controller stores the memory address sequencing of memory locations storing data for use during execution. In this manner, the core processor is free to perform other tasks, especially those requiring the core processor's computing abilities.

More specifically, with respect to the core processor 12 and operation of the sub-components thereof, the Instruction Cache 16 of core processor 12 receives instructions from external memory via instruction bus 24 and a data bus 26. The instruction cache 16 stores the instructions until they are accessed by CPU 14. In the preferred embodiment, instructions are direct mapped by the host computer 23 with a line size of 4 words, thereby permitting one instruction tag entry for every four words. It will be appreciated however, that greater or fewer words may be used.

Instruction Cache 16 is also designed to receive block refills of 2, 4, 8 or 16 words. This reduces the set-up time required to refill Instruction Cache 16, thereby increasing overall speed of operation. A valid bit for each word in the tag is included to allow single word memory accesses to be cached. Instructions received by Instruction Cache 16 are invalidated, if necessary, by CPU 14 of core processor 12. In the preferred embodiment, Instruction Cache 16 is a 4K byte deep cache allowing single cycle accesses for instruction fetches. Larger or smaller caches may be employed to achieve an equivalent result.

Data Cache 18 receives data transmitted across data bus 26, and stores the data until it is accessed by CPU 14. In the preferred embodiment the data cache is direct mapped with a line size of 4 words, similar to Instruction Cache 16. In order to reduce the time required to refill the data cache, sequential accesses of cache data fills are implemented with programmable block refill size of 2, 4, 8 or 16 words, which also reduces set-up time and therefore increases overall speed. The data cache 18 is a "write through" type device. In the preferred embodiment, data cache 18 is dedicated to CPU 14, will not cache data for any other device and is a 1K byte deep cache that allows single cycle access on data fetches. As with the instruction cache 16, a larger or smaller cache may be used. Timers 22 generate time delays for events and interrupts under program control. The timers 22 are comprised of pre-loadable countdown chains.

Bus Interface Unit 20 provides buffering and control logic for signals that are received or transmitted by core processor 12. Bus Interface Unit 20 also incorporates a 4 word deep write buffer 21 to prevent the CPU from stalling on STORE instructions to memory (i.e., write to memory instructions). In prior art devices, when the write buffer became full and the CPU executed a write to external memory, the processor would stall until the write buffer became available. The 4 word deep write buffer 21 of the present invention overcomes this problem of the prior art. If an entry is located in the write buffer 21, the buffer is updated and the stalling of the processor will be prevented. Because data in the write buffer is indeterminate for the first read cycle, the write buffer is flushed before a CPU data read cycle is effectuated. The write buffer 21 of the present invention operates in the same fashion as the "LSI" LR33000.

Bus Interface Unit 20 includes bus steering logic, memory bus arbitration, and interfaces Core Processor 12 to the other functional units external to the Core Processor. Core processor 12 shares an instruction bus 24 and a data bus 26 with coprocessor 28, a direct memory access (DMA) controller 30, and a video first in first out (FIFO) 32 and a video timing module 32. Both instruction bus 24 and data bus 26 transmits instructions and data between the host computer 23, and internal modules such as the core processor, coprocessor, or DMA controller.

In the preferred embodiment, instruction bus 24 is a 32 bit wide bi-directional bus which provides instructions to the CPU 14 and coprocessor 28. This bus transmits information to and from the core processor 12.

A video FIFO and video timing module 32 provides video graphics control, and incorporates the functions of commercially available video controllers which are well known in the art. Commercially available video controllers include those manufactured by Texas Instruments (TI34020), Hewlett Packard, DEC, General Instrument, and others. Video FIFO 32 provides the circuitry necessary to interface the present invention with a video monitor. By implementing video graphics control on a single integrated circuit, the overall component count is reduced, saving space, conserve power, and reduce assembly and test time.

A DMA controller 30 is also incorporated within the present device to reduce the overall component count, save space, conserve power, and reduce assembly and test time. DMA controller 30 responds to core processor 12 or coprocessor 28 to generate address information to external memory via a memory controller 42 as will be described in more detail hereinafter. Video FIFO and video timing 32 serves the purpose of generating video display images by determining scan timing and activating desired pixel addresses as required. Bus arbitration 44 receives requests from the core processor 12 and DMA controller 30 when access to external memory is requested by either of these units. DMA controller 30 transmits request signals to bus arbitration 34. Request granting signals are in turn transmitted from bus arbitration logic 44 when the request sought by DMA controller 30 is granted. When the request is granted via the transmission of a granting signal, DMA controller 30 will then control memory address lines 36 and will control external memory through memory controller 42, so that it can store destination data from the datapath.

A serial port 40 is provided for serial communication with a control keyboard, a mouse, touch pad, or track ball, or other serial devices. Serial port 40 performs the functions of commercially available serial ports, which are compatible with the serial port defined in the "IBM PS/2" TYPE1 standard, as will be appreciated. By implementing a serial port controller on a single integrated circuit, the overall component count is reduced, thereby saving space, power, and assembly and test time.

In the preferred embodiment, data Bus 26 is a 32 bit wide bi-directional bus which provides a data path between external memory, core processor 12, coprocessor 28, DMA controller 30, and video timing and video FIFO circuitry 32. This bus serves as an output during memory write cycles and as an input during memory read cycles. When the bus is driven by an external device using DRAM controller 30, a read of the odd data bank in interleaved system memory causes data from a second data bus, termed herein the MDATA bus 24, to be placed onto this bus.

Core processor 12 also has access to a second set of data and address lines the MDATA 34 and what is referred to herein as Maddress (MADDR) 36. Core processor 12 shares the MDATA lines with data bus translator 38, coprocessor 28, video FIFO and video timing module 32, and serial port 40. Core processor 12 shares the MADDR bus 36 with a serial port module 40, and a memory controller 42. Bus arbitration logic 44 is used to provide interrupts to and from external devices. It also arbitrates disputes over control of data and address lines, and requests for information between external devices, the core processor, and the DMA module.

The MADDR 36 and MDATA 34 busses are used to transmit memory addresses and transfer data to and from external memory, respectively. The MDATA bus provides data to and from an external DRAM memory interleaved systems. This, along with circuitry in the memory controller 42, allows the direct connection of a 64 bit wide interleaved memory to facilitate a high performance zero-wait state memory system for cache refills and video data refreshing out of DRAM memory. The MDATA bus 34 provides the data path for the odd word during interleaved operation. When the bus is driven by an external device using the controller, a write cycle to the odd bank in an interleaved memory system causes the data on data bus 26 to be driven onto the MDATA bus, 34.

In the preferred embodiment, coprocessor 28 includes thirty-two data registers and thirty-two control registers. It will be appreciated that more or less registers may be used. Video data control registers, a DMA controller, and serial port registers are mapped into this space to simplify their control.

Core processor 28 receives its commands as well as data from operations conducted by the host computer 23. Core processor 12 also responds to, and transmits commands to the host computer 23. Core processor 12 also transmits commands to coprocessor 28 for execution thereby and receives results from the coprocessor. Core processor 12 will also transmit commands to the DMA controller 30 and video and FIFO timing unit 32 in order to access external memory and drive a video display monitor(not shown). Core processor 12 also interfaces with a keyboard(not shown) via serial port 40 as will be appreciated by those skilled in the art. Core processor 12 also interfaces with data bus translator 38. Data bus translator 38 buffers information received from or sent to external memory not shown. Memory controller 42 receives address information from the core processor 12 or the DMA controller 30 and transmits that information to external memory. For predetermined bit mapped operations, core processor 12 will generate address data and send it to memory controller 42 which, in turn, will access external memory.

The preferred embodiment provides high performance, hardware assisted, pixel block transfer and fill capabilities to accelerate processing of pixel data, as will be described in more detail below. This allows fill and coprocessor data path operations to proceed as fast as external DRAM or VRAM will support. Thus, the present invention is compatable with fast page mode 64 bit interleaving and VRAM mask and block writes.

In order to achieve greater processing speed, certain graphic routines are performed with a combination of CPU instructions, coprocessor data path hardware, and DMA controller address data. Routines written in assembly language take full advantage of the coprocessor's acceleration capabilities. In the preferred embodiment, this set of graphics routines are implemented using reduced instruction set computer (RISC) commands.

Additional graphics routines are employed to further increase speed and decrease processing time. This permits implementation of graphics libraries which are adapted to specific commercial applications, such as X-Windows, Postscript, TIGA emulation, 8514 emulation, etc.

In order to accelerate processing, in the preferred embodiment, the coprocessor control section executes the following instructions through the coprocessor's data path without additional intervention from the CPU 12. Names of the following instructions refer to standard MIPS architecture instructions. It will be appreciated, however that the present invention is not limited to use with the MIPS architecture and can be implemented with other architectures.

A first instruction, MTC2, transfers data from the CPU to the addressed register of the coprocessor 28. A second instruction, MFC2, transfers data from the coprocessor register to the CPU. A third instruction, CTC2, transfers data from the CPU to a control register of the coprocessor 28. A fourth instruction, CFC2, transfers data from the coprocessor's register to a register of the CPU 14. A fifth instruction, LWC2 loads the coprocessor's register from the memory location addressed by the address in the CPU plus any offset that has been determined. A sixth instruction, SWC2, stores the contents of the coprocessor's control register in the memory location selected by the address in the CPU plus any offset that has been determined.

The following instructions are unique to the present invention, and have been developed to accelerate graphics processing and optimize flow through the data path. The following description is with reference to FIG. 2.

Figure 2:
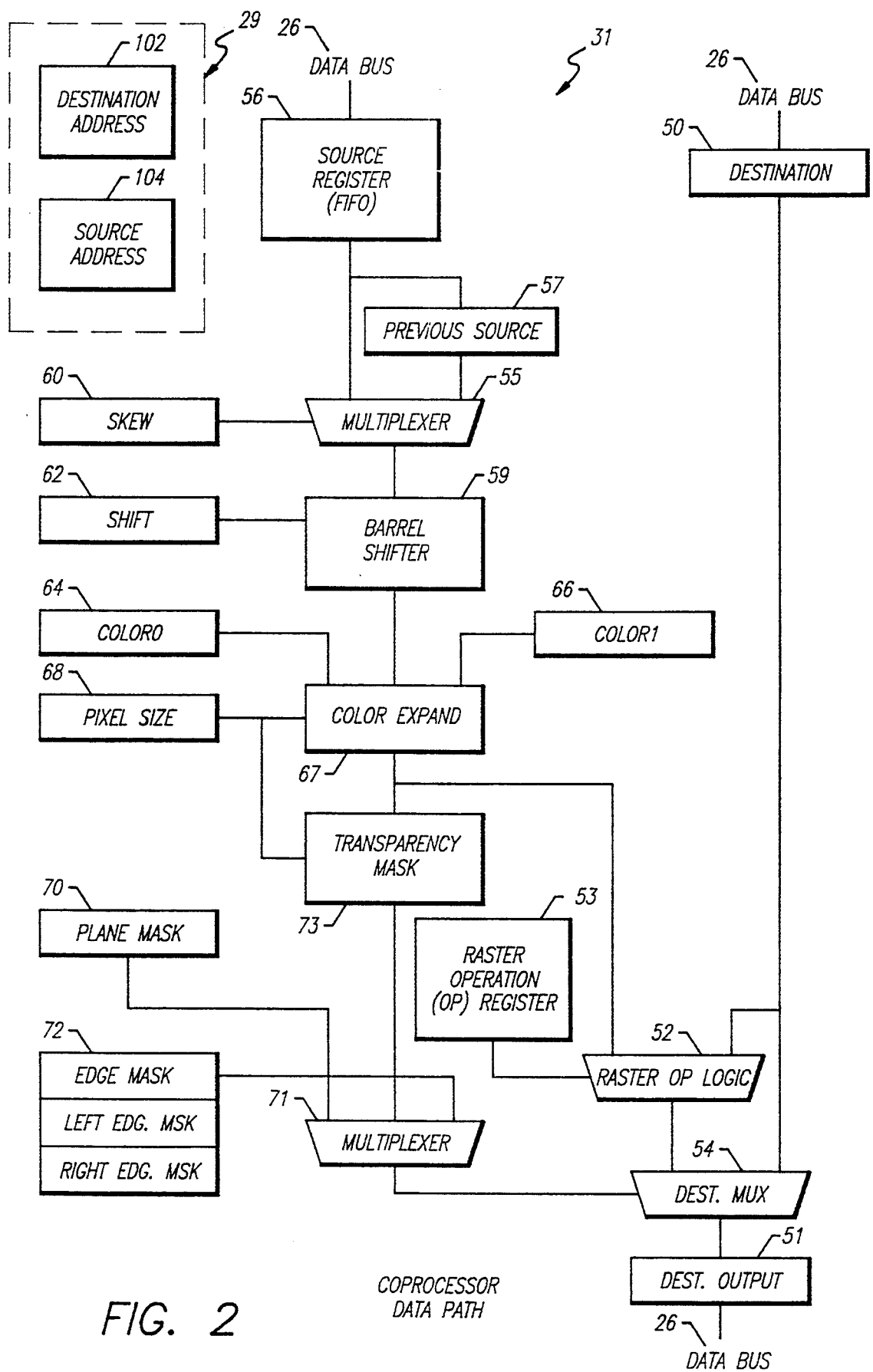
FIG. 2 is an expanded block diagram of the coprocessor data path portion of the high performance graphics applications controller of the present invention shown in FIG. 1.

A first coprocessor instruction, termed herein, SSTEP causes the coprocessor data path 31 to address the next word in a source register queue 56. The source queue 56 is a four deep FIFO and, is advanced one word at a time, while the previous first word in the FIFO is placed in a register which is termed herein the previous source register 57, as shown in FIG. 2. If no word is available from source queue 56, a memory block read request is generated to read the next source block which is pointed to by a current source address register (not shown), the current source address register is then incremented or decremented to point to the next block of source data to be read.

A second coprocessor instruction, termed herein SBSTEP, clears the source queue 56, and loads new data from the beginning of the line which was determined by the source line address register in the DMA controller 30 of FIG. 1. A memory block read reference is first generated by the coprocessor control 29 to read the source block. The source line register is then updated to point to the beginning of the next line, and the current source register is updated to point to the next block on the line.

A third coprocessor instruction, termed herein, WSTEP operates in conjunction with four flags, termed herein the S, SB, Left, and Right flags which supply parameters for operation. The flag settings are determined by the host computer 23. If the S flag is set, operation is equivalent to a SSTEP instruction followed by a WSTEP instruction with the S flag not set. If the SB flag is set, operation is equivalent to a SBSTEP instruction followed by a WSTEP instruction. The WSTEP instruction modifies the memory word pointed to by a current destination address register(not shown). If write only mode is set in the coprocessor's control register, a write operation is executed to the current destination. Otherwise a Read-Modify-Write operation occurs. If either the Left or Right flags are set, the associated Left or Right edge mask is applied to the data, and a Read-Modify-write operation is performed whether or not write only mode is set. Following the memory reference, the current destination register is updated to point to the next word on the line.

A fourth coprocessor instruction, termed herein, BSTEP, operates in conjunction with the previously mentioned four flags, the S, SB, Left and Right flags. If the S flag is set, the operation defined is equivalent to an SSTEP instruction followed by a BSTEP instruction with the S flag not set. If the SB flag is set, operation is equivalent to a SBSTEP instruction followed by a BSTEP instruction. The BSTEP instruction modifies the memory word pointed to by the destination line address register. If write only mode is set in the coprocessor's datapath control register 29, a destination write operation occurs. Otherwise a Read-Modify-Write operation occurs. If either the Left or Right flag is set, the associated Left or Right edge mask 72 is applied to the data, and a Read-Modify-write operation is performed whether or not a write only mode is set. Following the memory reference, the current destination register is updated to point to the next word on the line, and the destination line register is updated to point to the beginning of the next sequential line.

The above listed instructions have been selected because they were found to require substantial CPU 14 processing time to execute operations which were readily implementable with hardware. By having these selected, time consuming instructions performed by coprocessor 28, the demands placed on CPU 14 are greatly reduced, thus resulting a greater overall processing speed.

The coprocessor datapath 31 provides the data transfer and manipulation capabilities of the present invention. The coprocessor datapath 31 is comprised of first and second sections, which are, respectively, a data manipulation section and a destination determining section. The destination determining section is comprised of destination register 50, which in turn, is coupled to a destination multiplexer 54 that is coupled to a destination output register 51. The data manipulation section is comprised of the other operational blocks shown in FIG. 2 as will be hereinafter described. The first section performs data manipulation functions and the second section contains destination information which directs the output of the data manipulation section.

Coprocessor 28 and DMA controller 30 (shown in FIG. 1) are addressed in common address regions which, in the preferred embodiment, are addresses 0–32. This increases processing speed by reducing the amount of time which would be required to decode addresses if two separate address ranges were used. DMA controller 30 and coprocessor 28 thus cooperate to achieve faster, more efficient processing. DMA controller 30 organizes and stores addressed sequences. Coprocessor 28 causes DMA controller 30 to access the data stored at the memory location determined by the address sequence for processing and the coprocessor datapath 31 shown in FIG. 2. DMA controller 30 also stores pixel memory addresses for transferring pixel data to the datapath 31 and for storing destination data therefrom. The datapath 31 processes the source data received from external memory and transmits the results to external memory through destination multiplexer 54 along data bus 26.

The 32 bit datapath 31 provides for source skew alignment, transparency task capabilities, color expand capabilities, source plane masking, contains a 16 function logic unit raster operation, and destination boundary and pixel masking. When DMA controller 30 directs loads and stores between the coprocessor datapath 31 and external memory, the data bypasses the CPU data cache 18 and the write buffer 21 of the CPU 14. When the CPU 14 executes either SWC2 or LWC2 instructions, the data passes through the CPU write buffer 21 to execute store operations, and if directed to by the CPU 14, the data passes shifted through data cache 18 for load operations. The CPU 14 directly executes load or store operations from any of the datapath 31 registers into either registers of the CPU 14 or external memory. The DMA controller 30 may directly load the coprocessor's datapath source and destination registers, or execute store operations from the coprocessor's datapath output buffer as required.

In the preferred embodiment, all DMA addressing is comprised of linear memory addresses. The CPU 14 performs address space conversion and/or allocation when setting up coprocessor datapath operation.

Destination memory address registers 102 consists of several registers which assist in directing data flow. A first register thereof, termed herein the current destination register, specifies the next addressed word in memory. A second register of the destination memory address registers 102, termed herein the destination line start register, specifies the start address of the current scan line for the data destination. A third register of the destination register 102, termed herein the destination pitch register specifies the value to add to the destination line start register to increment the memory address corresponding to the next scan line.

Source address registers 104 contains several registers which specify the address of the next data source to be accessed. A first register thereof, termed herein a current source register, specifies the word to be next addressed in memory. A second register of source register 104, termed herein source line start register, specifies the starting address corresponding to the memory location storing the current scan line value for the data source. A third register, termed herein the source pitch register, specifies the value to add to the source line start register to increment to the next scan line value.

It is possible that the CPU 14 may issue additional coprocessor instructions while the DMA controller 30 is occupied. This causes the CPU 14 to stall, or wait, until the previous CPU instruction is completed. A three bit deep coprocessor instruction pipeline allows the CPU 14, of FIG. 1, to move ahead in the instruction stream with a minimum of waiting for the coprocessor 28 to respond. All CPU 14 instructions which affect coprocessor 28 will be executed in order. Coprocessor 28 instructions, once advanced past the CPU 14 memory pipeline stage may execute out of order with other CPU 14 instructions, and may continue regardless of CPU errors. The CPU 14 determines whether the coprocessor 28 is occupied by executing an instruction and checking the coprocessor 28 condition bit. Branch on coprocessor 22 true or branch on false instructions are preferred because they will not force the coprocessor 28 to stop processing.

A register termed herein the destination register 50 stores data which is used as an input to the destination multiplexer. Reading register 50 causes data from destination output register 51 to be placed on data bus 26.

The data portion of coprocessor 28 accepts data from data bus 26 into a separate register as determined by the address transmitted on Instruction Bus 24, as shown in FIG. 1. Incoming data is buffered in the coprocessor datapath 31 by way of a source register 56 FIFO, which in the preferred embodiment is four words deep. The source FIFO register 56 allows multiple instructions to be transferred to the coprocessor data path for execution without the necessity of additional input.

The coprocessor 28 also contains a variety of internal control registers which store instructions and process data. A register termed herein the source skew register 60 controls a multiplexer 55 that determines which bits from the source FIFO register 56 and which bits from a register termed herein the Previous Source register 57 are selected for use as inputs to the remainder of the datapath. The output of FIFO register 56 contains source data which is presented to a source bit multiplexer 55 and previous source register 57. The previous source register 57 latches data outputted by FIFO register 56. The previous source register 57 releases data input one cycle behind the current output source data from FIFO register 56.

Data is directly loaded into the source FIFO register 56 by executing loads from the source data register 104. The first item in the FIFO 56 is read by executing a move or store operation with the source data register selecting the register to be moved or read. Intermediate FIFO registers are not directly readable or writable from the CPU 14. Other predetermined commands transmitted by DMA controller 30 causes FIFO register 56 to be loaded with four words of data. Commands transmitted by core processor 12 of FIG. 1 reset the FIFO register pointer.

A barrel shifter 59 consists of a 32 bit barrel shifter that shifts data presented by multiplexer 55 circularly to the right by an amount determined by a register termed herein as the source shift register 62. The barrel shifter serves the purpose of aligning the data to correspond to the edge of the video display, as will be appreciated by those skilled in the art. This ensures that the desired data is presented to a color expand multiplexer 67.

A register termed herein the color1 register 66 determines the foreground color to be used when color expand multiplexer 67 is enabled. A register termed herein the color0 register 64 determines the background color to be used when color expand is enabled. The color value for pixel sizes less than 32 bits are repeated to fill the 32 bit color1 register.

A register termed herein the pixel size register 68 determines the pixel size used for a color expand multiplexer 67 and a register termed herein as a transparency mask register 73. The pixel size register 68 controls the color expand transparency. The color expand multiplexer 67 is enabled by a register termed herein the pixel size register 68, and selects the output of color0 register 64 or the color1 register 66, as determined by the pixel size register. For pixel sizes less than 32 bits, the color is repeated to fill the 32 bit color0 register.

Color Expand Multiplexer 67 receives data presented by barrel shifter 59 and binarally expands it to the pixel size determined by pixel size register 68. Because of the 32 bit data path, the transparency mask 73 expands the LSB (least significant bit) of the barrel shifter 59. The color expand multiplexer 67 expands data as follows data input to 32 bits if the pixel size register has a 32 bit value (11111). The color expand multiplexer 67 will expand the data input to two LSBs if the pixel size register has a 16 bit value (01111), and to the four LSBs if the pixel size register is 8 bits, etc. The color expand multiplexer selects the pixel data output from the Color0 Register 64 if the pixel value is 0, and the Color1 Register if the desired pixel value is 1 (background and foreground colors).

The Transparency mask register 73 receives a single bit per pixel source bit map from the color expand multiplexer 67 and expands it to generate a mask value based on the value stored outputted of the pixel size register 68. This mask value is then applied to a mask generation multiplexer 71, or may be written to the data bus for mask write operation and block write operation support. When the transparency mask register is enabled, data from the Color1 register is selected.

Mask generation multiplexer 71 merges the output provided by a register termed herein the plane mask register 70 and the output provided by a transparency mask register 73 into a single value which drives a destination multiplexer 54. The output of mask generation multiplexer 71 ultimately enables selective masking of pixel colors of a video display (not shown).

A register termed herein the Edge mask register 72 comprises two registers, which are termed herein as a left mask register and a right mask register. The registers output a value that determines the boundaries of the effected block of pixels. The Left Edge Register contains a mask value to be applied at the left edge of a Bit Block transfer. The Right Edge Register contains a mask value to be applied at the right edge of a Bit Block transfer operation, as will be appreciated.

The plane mask register 70, transmits information to a mask generator multiplexer 52, which in turn generates a mask for data bits generated by a raster operations logic unit 52.

A register termed herein the Raster Operations Function Register 53 determines what function is to be performed by raster operations logic unit 52 on source and destination data. Raster Operation Logic Unit 52 performs one of the sixteen logic operations on the data presented by the data path source and destination inputs, as will be appreciated. Raster operation logic performance is equivalent to that defined in the X Window standard. Register 53 specifies which logical operation to perform at any given time.

A destination multiplexer 54 directs data on a bit by bit basis, and selects either the data from the raster operations logic unit 52 or the data in the Destination Register 50. This selection is determined by the value output by the mask generator multiplexer 71.

A coprocessor control register within copressor control 29 (FIG. 1) contains several flags which are used to control sequencing of operations. These flags are cleared on reset, and must be loaded with the required value by CPU 14. A first flag determines the size of the destination pixel map.

A second flag enables transparency multiplexer 73. A third flag enables color expansion. Source pixel data either is not used or is a constant loaded by the CPU. A fourth flag causes the coprocessor's datapath to treat source data as mask data instead of pixel data. A fifth flag forces the coprocessor datapath to use the VRAM mask feature in applying the mask value instead of doing Read-modify-write operations on destination data.

A sixth flag prevents the coprocessor's datapath from reading destination data before executing write operations. which also disables Read-modify-write operations for the destination data. The destination data is then read on the first and last words of a line.

A seventh flag forces the coprocessor's datapath to perform block writes in VRAM. A eighth flag determines the direction of data movement within a scan line (in the X direction) and whether word step operations will include an increment or decrement of the destination and/or source address. An ninth flag determines the direction of data movement from one scan line to another (in the Y direction) and indicates whether line step operations will include an add or subtract to calculate the start of the next line.

A tenth flag sets the VRAM color register in write mode. Once set, store instructions will cause the COLOR register in RAM to be written to instead of modifying the addressed data.

Additional device efficiency is obtained by explicit memory mapped addressing. This mapping allows CPU 14 to control which accesses to the memory are cached.

In the preferred embodiment, the lower 512 Mbytes of memory are accessed by the coprocessor software from three different CPU 14 memory locations. The first memory location is used to specify non-cacheable, kernel mode operation. The second memory location is used to specify cacheable, kernel mode operation. The third memory location is used to specify cacheable user mode operation. This versatility allows nonconflicting reuse of memory space and eliminates the need for additional redundant memory.

The preferred embodiment provides a DRAM controller 30 for a simple interface to a high performance interleaved 64 bit fast page mode memory system, a 32 bit non-interleaved fast page mode system, or a single cycle memory system. A fixed address range of 0 to $0 \times 0FFF.FFFF$ (Hex) is supported by the DRAM controller to provide a 256 Mbyte memory space. A bit termed herein the DRAM Controller Enable Bit permits the DRAM controller to be used to accesses address space 0 through $0 \times 0FFF.FFFF$. If disabled, the system will initiate a bus cycle to externally decoded memory space. Data is always written or read on data bus 26 if the DRAM controller is disabled. This bit is set to zero (disabled) on reset.

This use of a fixed memory space enables faster operation because it is not necessary for the core processor or the DMA controller to find the data location in a look-up table, or to perform any mathematical operations other than increment or decrement.

The DRAM controller 30 can support a two bank memory system by interleaving memory. This is implemented through the use of three signals, termed herein interleaved, RAM select 0, and RAM select 1. In the preferred embodiment, the DMA controller can support one 32 bit wide bank of DRAMs or one 64 bit wide bank of interleaved DRAMs plus a second bank of DRAM or VRAM, which is either interleaved or non-interleaved. The size of the lower memory bank is programmable from 1 Mbyte to 128 Mbytes to allow multiple memory banks to have contiguous memory addresses.

The DRAM controller 30 of FIG. 1 supports 4 or 8 word burst read cycles to interleaved memory, 4 word burst read cycles to non-interleaved memory, and single cycle (4 clocks) read or write cycles when running a read cycle generated internally.

A bit termed herein row address select (RAS) Precharge Time is generated by the DRAM controller 30 (FIG. 1) insure additional cycles of pre-charge time before data access. This ensures that data is stable before it is read. A built-in minimum 2 cycle pre-charge time between accesses may be increased to three cycles. If this bit is set, an external access to the DRAM array that does not use the DRAM controller is responsible for assuring that pre-charge timing requirements are met.

A bit termed herein the column address select (CAS) Active Length is generated by the DMA controller 30 to extend the active length of both CAS and RAS by one cycle to support slower DRAMs or buffer logic. The DRAM controller 30 will perform single cycle read or write accesses when an external device requests a DRAM read or write cycle to be performed. The DRAM controller 30 supports CAS before RAS refresh cycles through the use of the DRAM Refresh timer.

The DMA controller 30 also generates a bit termed herein the DRAM Refresh Enabled bit enables the on-chip refresh generator. This bit is reset on power-up. Normally, DRAM and VRAM will require the refresh generator to be active. In certain systems, screen refresh or other events will supply DRAM refresh signals. The DMA controller 30 also generates a bit termed herein the Block Fetch Disable which disables DRAM block fetches and forces all access cycles to DRAM to be single word only. In one preferred embodiment, this cannot be used with 64 bit interleaved memory systems.

A set of three bits generated by DMA controller 30, termed herein the DRAM Lower Array Size, determines which of two different address ranges, termed herein RAS0 and RAS1, is selected.

A two bit field termed herein, Instruction Cache Block Size, determines the number of data words which are loaded on instruction cache block refills. 00 loads 2 words, 01 loads 4 words, 10 loads 8 words, 11 loads 16 words. As with the other bits described above, this two bit field is generated by DMA controller 30. The above described bits are stored in various registers within DMA controller 30 of FIG. 1.

A two bit field termed herein Data Cache Block Size determines the number of data words which are loaded on data cache block refill. 00 loads 2 words, 01 loads 4 words, 10 loads 8 words, 11 loads 16 words.

The interface provided by one embodiment of the present invention enables execution from both 8 bit and 32 bit devices with the use of a signal termed herein Byte Wide Enable. This signal is asserted by DMA controller 30 at the beginning of a memory bus cycle and directs the core processor to transfer data to memory in 8 bit wide format. The processor will then request four consecutive bytes from memory beginning at the word aligned to the byte address first generated, and will increment until the complete addressed word has been collected, and gather them into an on-chip buffer in 32 bit wide format. Byte Wide Enable is active low. This allows execution from an 8 bit wide memory system.

A signal termed herein the ROM Memory Space Select output signal from the DMA controller 30 indicates that ROM address space is being accessed. This signal is used to select desired DRAM chips and/or as an output to enable external tri-state buffers. The address bus and the read/write select signals are stable when this signal is generated. The length of this signal is a predetermined number of system clock cycles, but can be shortened by instructing the DMA memory controller 30 that data is ready. The ROM address space communicates via data bus 26. Operation from 8 bit memory is achieved by tying the ROM memory output to the Byte Wide Enable input. Instructing the DMA controller 30 that data is ready is accomplished by asserting a signal termed herein data ready. Data ready indicates that external memory can accept, or that it is providing data for the current data bus 26 or Mdata bus 34 transaction. DMA controller 30 asserts data ready when DRAM, ROM, or input/output address space is selected.

One embodiment of the present invention provides 4 chip select regions in the DMA controller, termed herein Input/Output Space Select 1 through 4, and has separate wait state generation for each region. The access time for each byte or word is set between 2 and 17 wait states depending on user requirements. These chip select signals are termed herein PROM chip select (PROMCSN), input/output chip selects one (IOCS1N), two (IOCS2N), and three (IOCS3N). These signals are activated when a memory request is generated for the associated address region. Each address space is 16 Mbytes. This eliminates the need for added circuitry to decode the address range before a chip select signal is applied. This feature also reduces the set-up time required, because additional layers of logic are not present.

A four bit field, termed herein chip select Wait State, determines the number of wait states to insert during PROM accesses to allow connection to devices having different time requirements. Each wait adds to a minimum 2 clock wait. Data ready can be asserted to terminate the bus sequence early. This is set to 15 on RESET (which corresponds to a 17 clock bus sequence).

A signal termed herein PROM chip select disable inhibits internal generation of data ready. When set, PROM chip select disable will remain active and the bus cycle will stall until the external data ready signal is activated. This bit is cleared on reset.

The Input/Output chip select outputs (IOCS1N, IOCS2N, and IOCS3N) of the DMA controller 30, are active low and are asserted when the address bus accesses the address range. The Input/Output chip select output signals of DMA and are selectively employed as a chip select and/or output enables to external tri-stated buffers. The address bus and the read/write select signals are stable when one of these signals are generated. The length of each signal is a programmable number of system clocks cycles, although this can be shortened by asserting data ready. These address space selects always cause data to be placed on data bus 26.

This provides the capability for PROMCSN, IOCS1N, IOCS2N and IOCS3N to directly control I/O devices. Each of these chip selects of the DMA controller 30 has additional features determined by control fields. The control field includes a four bit wide field that controls the number of wait states inserted into a bus cycle addressing this memory space. A minimum 2 clock bus a cycle wait state is employed if one bit, referred to herein as IODLY is false (zero) which is set to three clock bus cycles if IODLY is true. Additional wait states are added to the 2 clock bus wait cycle by DMA controller 30. Data ready can be asserted to terminate the bus sequence early. This bit field is set to 15 on RESET. PROM chip select stores the reset exception vector address.

There is also a three bit wide field which adds wait state cycles between accesses to an I/O region. A minimum one clock between IOCS's occur if IODLY is off and two clocks if IODLY is true. This field is set to 0 on a RESET.

An additional bit delays the chip select signal for one clock after the bus cycle has started. This insures that the address and write and read signals are valid before the respective I/O chip select is activated. This bit is disabled on RESET.

A bit termed herein I/O chip select disable (IODIS) disables internal generation of data ready. When I/O chip select disable is set, IOCS1 will remain active and the bus cycle will stall until the external data ready signal is activated. This bit is cleared on reset.

All bus accesses not controlled by DRAM chip select, ROM chip select, or one of the input/output chip selects will execute memory bus accesses using the default parameters. Default parameters specify two clock cycles, and may be extended by delaying assertion of data ready. Programming ensures that the delay does not exceed display refresh requirements.

DMA controller 30 provides sequencing of memory addresses for coprocessor source and destination pixel data, video FIFO refresh/hardware cursor refresh, and VRAM SAM refresh.

DMA controller 30 automatically generates and updates pixel addresses for moving pixel data into and out of the coprocessor datapath. CPU 14 loads the appropriate address registers at the beginning of coprocessor datapath operation and allow DMA controller 30 to perform the actual memory references. This reduces dependance on the CPU 14. Once coprocessor datapath operation has been set up, the CPU 14 can simply execute a series of word step instructions to step through the movement or generation of pixel data. While DMA controller 30 is busy, the CPU may execute other instructions. This allows efficient execution of operations such as clip detection. For more complex operations, the CPU 14 selectively single steps through address generation while modifying registers in between coprocessor datapath steps.

The 32 word video FIFO selectively refills a Video DMA channel to ensure that no underuns occur during screen refresh. The DMA controller 30 requests 8 word blocks of data from memory based on demand by the Video FIFO 32. A new block is requested whenever there is room for 8 additional words in the video FIFO 32. Once a block of data has been requested, the DMA controller 30 automatically updates the DMA address registers to point to the next block. Address registers of the DMA controller 30 are updated on the leading edge of the vertical blank interval to point to the start of screen memory.

When VRAM mode is enabled, this DMA controller 30 refreshes display data which is stored in VRAMS. The Display refresh operation is similar to the DRAM based frame buffer operation except that pixel data goes directly from the 2nd data port of the VRAM chips to the video display, and bypasses the datapath of the present invention. The DMA controller 30 handles both full Serial Access Mode (SAM) reloads of the VRAM serial shift register, and also selectively controls split SAM reloads when directed. Use of the split SAM reload feature requires use of VRAMs which support split reloads, but allows display widths other than $2^n$ pixels without wasting memory. Reloads are initiated by the Video timing hardware. The video timing unit includes logic to monitor the QSF output from VRAM, and requests split SAM transfers as required. Full SAM transfers are only performed at the horizontal synchronization time interval.

The DMA controller 30 contains several registers which aid in operation. A first register, termed herein Screen Start holds the address of the first pixel of screen data (upper left corner) and is loaded at initialization time. Screen Start only needs to be modified for operations like hardware panning.

A second register, termed herein Screen Pitch determines the pitch of the screen, in bytes, and is loaded by when initialization occurs. A third register, termed herein Next Display determines the address of the next line to be displayed, and is updated by hardware. A fourth register, termed herein display current register determines the next block to be fetched and is updated by hardware.

A fifth, termed herein Block Size register determines the size of data blocks (in bytes) to be fetched when in DRAM video FIFO mode.

A sixth, termed herein SAM-EXTENT is a mask which determines the size of the external VRAM Serial shift register, and is loaded with a value equal to half the size of the SAM shift register in bytes.

Another DMA controller 30 register provides hardware cursor address generation when the FIFO is used to refresh hardware cursor data and mask data instead of display buffer data. FIFO refresh occurs automatically when hardware cursor mode is enabled. This channel contains several registers which aid in hardware cursor address generation. A first determines the starting address of the cursor. This register should be loaded by software to point to the upper right corner of the cursor. A second determines the address of the next block to be fetched, and is not loaded by software. In the preferred embodiment, the cursor has as fixed size of 64 by 64 by 2, thereby eliminating the need for a pitch register.

The preferred embodiment provides a direct interface from the DMA controller 30 to directly control standard, commercially available fast page mode DRAM, such as are manufactured by Texas Instruments, Micron Technologies (MT4C4001), and others. This direct interface eliminates the need for additional logic to drive the DRAM, thus reducing the overall component count, and reducing gate delays, thereby increasing speed.

The following signals are generated by the DMA controller 30 in combination with the memory controller 42 as required.

A signal termed herein the Address Strobe is a bi-directional signal which is active low. This signal will be generated when a bus cycle that is not decoded by the address decoder is being performed.

A signal termed herein the Block Fetch Request is bi-directional and active low, and indicates that a burst access to memory is being requested. If the memory system being addressed does not support block fetch, then BLKFETCHN is not asserted. If the DRAM controller is enabled, this signal can be ignored for DRAM cycles. When an external device is requesting use of the DRAM controller, this signal is used as an input to indicate whether a block fetch is to be executed.

A signal termed herein the Block Fetch Acknowledge (BLKFETCHN) input signal is asserted in response to Block fetch request for externally controlled memory systems. The signal is asserted low only if the addressed device supports block fetch. Leaving the signal high forces single word read operations. It is not driven low for DRAM cycles.

A signal termed herein the Write/Read signal is bi-directional and when low indicates a read operation. It indicates whether the current memory transaction is a read or a write. This signal is driven high when an external device controls the bus.

A signal termed herein the Memory Transaction Start output is active low and is driven for one cycle at the beginning of each memory cycle initiated by CPU 14. It is not driven for DMA cycles.

A signal termed herein the Cacheable datum input is set low to indicate that the data being fetched is cacheable. For external DMA bus writes, this signal is set low to indicate that the CPU 14 is examining all data.

A signal termed herein The Bus Request input (BREQN) signal is active when set low and is asserted by external devices to request memory control. External devices requesting control may or may not use the DRAM controller 30 internal to the present invention.

A signal termed herein the Bus Grant output signal informs the external device requesting the bus that the following signals have been tri-stated, and that it is appropriate for an external device to control the following signal lines: Instruction bus 24, data bus 26, Maddress bus 36, and Mdata bus 34. On the activation of a signal termed herein, ASN, the DRAM controller will examine the Maddresss bus 36 and a read/write select signal and indicate a DRAM cycle if appropriate. The address bus and the read/write select signal must have a defined source and be stable for proper operation. The external device is also responsible for proper generation of write enable signals. All external control sources, such as host computer 23, transmits data on data bus 26, the DRAM controller 30 will gate odd word write access to Mdata bus 34 and odd word read access from data bus 26 when this signal is asserted. External devices using DRAM controller 30 may only perform single cycle read and write accesses.

A VRAM shift indicator input, termed herein QSF is connected to the QSF signal output from external VRAMs for VRAM based frame buffers. It is used to determine when the next split SAM transfer should occur.

When executing VRAM block writes, the data bus must be permutated according to the operation being performed. Internal to each VRAM (for 4 bit wide parts), Block Write is functionally equivalent to expanding a monochrome bit map to a 4 pixel bit map and applying it as a mask for the color register in the VRAM. This provides significant performance improvement for operations such as drawing characters, since only one VRAM bus cycle is needed to write 4 words.

One embodiment of the present invention supports bit permutation for a 4 bit wide external VRAM. Since the VRAM is only capable of a 1 to 4 expansion, supporting block writes with 4, 8, 16 and 32 bit expansion is accomplished by permutating the data applied to the VRAM and partially expanding the source bitmap in each case. Thus, the order of the MDATA bus 34 input pins are 31 through 00, sequentially, while the order of the output is correspondingly permutated as follows: 31/23/15/07/30/22/14/06/29/21/13/05/28/20/12/04//27/19/11/03/26/18/10/02/25/17/09/01/24/16/08/0-0. These permutations are achieved by permutation multiplexes within DMA controller 30.

Thus, for block writes, the permutation will apply bit 0 of the output of coprocessor mask generator 71 (FIG. 2) to pin 0 of data bus 26, bit 8 to pin 1 of the bus, etc. For 4 bits per pixel expansion, the monochrome bitmap is applied (along with any enabled mask registers) directly to the permutation muxes. For 8, 16, 32 bits per pixel, the bitmap is first expanded to 2, 4, 8 bits per pixel respectively. As such, a coprocessor data path 31 first performs a partial bitmap expansion using the upper 2 bits of the pixel size. A size of 1 or 2 bits per pixel cannot be supported for block writes in the preferred embodiment.

Three external interrupts and three internal interrupts provide a vectored interrupt arrangement so that the CPU 14 can determine the priority for handling simultaneous interrupts.

The present invention is equipped with a reset input which is a Schmitt trigger input (not shown), is active low and is used to reset the state of the CPU 14. It has a Schmitt triggered input with a pull-up resister so that a reset circuit can be implemented with minimum of external logic. When this signal is low, all chip outputs and bi-directional lines are tri-stated.

The present invention is driven by a system clock which supplies the CPU 14 cycle clock, the DRAM controller 30 synchronous clock, and the general purpose timer clock. All memory bus signals are synchronized to this clock for ease of use, but may be asynchronous in another embodiment of the present invention. The second timer counts whenever it is enabled, and toggles each time it reaches it's terminal count.

A signal is driven high by the CPU 14 to indicate that the bus transaction is an instruction fetch. When active low, it indicates that the bus transaction is a data read or write transaction.

A signal referred to herein as the Stall output is active high and identifies when CPU 14 is stalled, and that CPU 14 is waiting for execution of an instruction.

A signal termed herein the Branch Taken output is active high and identifies when CPU 14 is taking a branch during instruction execution. This signal is employed in tracing instruction flow.

The present invention contains numerous registers which store data or control information for varying periods of time before they are used for processing. In order to more easily describe the contents and operation of the preferred embodiment, these registers have been given names are suggestive of the register's contents. These names are in no way intended to limit, or determine the contents or operation of the register, which depends solely on the description of the register's contents or operation. It will be appreciated that those skilled in the art may make deviations from the preferred embodiment, including functions or commands implemented by the coprocessor, language in which they are implemented, number or length of registers, operational characteristics of the DMA controller, etc., yet implement the teachings of the present invention. It will be appreciated that the present invention is limited only by the scope and spirit of the appended claims and all equivalents thereto.

What is claimed is:

1. A high performance graphics applications controller comprising:
a core processor;
a co-processor sharing a common instruction set with said core processor;
said core processor executing at least one instruction from said common instruction set when at least one other instruction from said common instruction set is received by said co-processor;
said co-processor executing said at least one other instruction using hardware dedicated to the execution thereof;
said co-processor executing said at least one other instruction independently of said core processor;

said co-processor executing said at least one other instruction using a hardware data path, said hardware data path functions including a barrel shifter operation in which said barrel shifter circularly shifts data in order to align the data to correspond to the edge of a video display;

a first color register to determine the background color when an external color monitor is used, a second color register to determine an alternate background color, a color expand function which selectively applies the color specified by said first color register or the color specified by said second color register when an external color monitor is used;

an edge mask register further consisting of a left edge mask and a right edge mask which determines the boundaries of the video data being manipulated;

a raster operation function which selectively performs a logical operation on the video data; and a destination multiplexer which selectively determines which internal source of data is output on a bit by bit basis.

2. The high performance graphics application controller of claim 1 and further comprising a memory controller operating under the control of said core processor and said co-processor;

said memory controller and co-processor sharing a common address range, said co-processor selectively directing said memory controller to access data stored at a predetermined memory location, said co-processor manipulating that data in said hardware data path, said co-processor causing said memory controller to store the results of said hardware data path operation in memory.

3. The high performance graphics application controller of claim 1 and further comprising a memory controller operating under the control of said core processor and said co-processor;

a source address register set which specifies the address of the next data source to be accessed by said memory controller;

a destination address register set which specifies the address to be selected by said memory controller in storing data output by said hardware data of said co-processor.

* * * * *